(12) United States Patent
Ma et al.

(10) Patent No.: US 11,440,446 B2
(45) Date of Patent: Sep. 13, 2022

(54) CHILD RESTRAINT SYSTEM

(71) Applicant: Wonderland Switzerland AG, Steinhausen (CH)

(72) Inventors: Andrew Ma, Exton, PA (US); David A Lehman, Lancaster, PA (US); Kyle S Mason, West Lawn, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 16/737,873

(22) Filed: Jan. 8, 2020

(65) Prior Publication Data
US 2020/0223332 A1 Jul. 16, 2020

Related U.S. Application Data

(60) Provisional application No. 62/790,707, filed on Jan. 10, 2019, provisional application No. 62/846,140, filed on May 10, 2019.

(51) Int. Cl.
*B60N 2/28* (2006.01)
(52) U.S. Cl.
CPC ......... *B60N 2/2875* (2013.01); *B60N 2/2857* (2013.01)
(58) Field of Classification Search
CPC ...... B60N 2/28; B60N 2/2821; B60N 2/2857; B60N 2/286; B60N 2/2863; B60N 2/2875
See application file for complete search history.

(56) References Cited

U.S. PATENT DOCUMENTS 1,501,443 A 7/1924 Ellis
2,278,078 A 3/1942 Kahn
(Continued)

FOREIGN PATENT DOCUMENTS

AU 2017272241 A1 6/2018
CN 101633331 A 1/2010
(Continued)

OTHER PUBLICATIONS

Australian Patent Application No. 2020200195; Office Action dated Oct. 23, 2020; 6 pages.
(Continued)

*Primary Examiner* — James M Ference
(74) *Attorney, Agent, or Firm* — Cantor Colburn LLP

(57) ABSTRACT

The present invention discloses a child restraint system including a main body and an adjusting foot. The main body includes a seat portion, a backrest portion, a first supporting portion and a second supporting portion. The first supporting portion is located adjacent to a first end of the seat portion away from the backrest portion, and the second supporting portion is located adjacent to a second end of the seat portion connected to the backrest portion. The adjusting foot is movably disposed on the main body and includes a third supporting portion. The first supporting portion and the third supporting portion abut against a vehicle seat to support the child restraint system at a forward facing position on the vehicle seat. The second supporting portion and the third supporting portion abut against the vehicle seat to support the child restraint system at a rearward facing position on the vehicle seat.

16 Claims, 14 Drawing Sheets

(56) References Cited

U.S. PATENT DOCUMENTS

| | | | | |
|---|---|---|---|---|
| 4,186,962 A * | 2/1980 | Meeker | B60N 2/2839 |
| | | | 297/256.13 |
| 4,391,453 A | 7/1983 | Gläser | |
| 4,688,850 A * | 8/1987 | Brownlie | A47D 13/025 |
| | | | 297/131 |
| 4,729,600 A * | 3/1988 | Single, II | B60N 2/2821 |
| | | | 297/256.13 |
| 4,913,490 A * | 4/1990 | Takahashi | B60N 2/2821 |
| | | | 297/130 |
| 5,052,750 A * | 10/1991 | Takahashi | B60N 2/2863 |
| | | | 297/256.13 |
| 5,106,154 A * | 4/1992 | Kain | B60N 2/286 |
| | | | 297/130 |
| 5,181,761 A * | 1/1993 | Meeker | B60N 2/2821 |
| | | | 297/256.13 |
| 5,468,014 A | 11/1995 | Gimbel et al. | |
| 5,505,519 A | 4/1996 | Natt | |
| 5,722,720 A | 3/1998 | Lumley | |
| 5,836,649 A | 11/1998 | Bonetti | |
| 5,957,531 A * | 9/1999 | Kane | B60N 2/2812 |
| | | | 297/256.14 |
| 5,971,479 A | 10/1999 | Jacquemot et al. | |
| 6,170,911 B1 * | 1/2001 | Kassai | B60N 2/2821 |
| | | | 116/215 |
| 6,264,278 B1 | 7/2001 | Weimer et al. | |
| 6,318,799 B1 * | 11/2001 | Greger | B60N 2/1835 |
| | | | 297/256.13 |
| 6,347,832 B2 * | 2/2002 | Mori | B60N 2/2821 |
| | | | 297/250.1 |
| 6,554,358 B2 * | 4/2003 | Kain | B60N 2/2806 |
| | | | 297/256.13 |
| 6,834,915 B2 * | 12/2004 | Sedlack | A47D 13/02 |
| | | | 297/253 |
| 7,044,549 B2 | 5/2006 | Maier et al. | |
| 7,073,859 B1 * | 7/2006 | Wilson | B60N 2/0232 |
| | | | 297/250.1 |
| 7,207,628 B2 | 4/2007 | Eros | |
| 7,464,990 B2 | 12/2008 | Collias | |
| 7,735,921 B2 | 6/2010 | Hutchinson et al. | |
| 7,887,128 B2 * | 2/2011 | Zink | B60N 2/2824 |
| | | | 297/256.13 |
| 7,901,003 B2 * | 3/2011 | Meeker | B60N 2/2851 |
| | | | 297/250.1 |
| 8,061,773 B2 | 11/2011 | Collias | |
| 8,123,295 B2 | 2/2012 | Hutchinson et al. | |
| 8,136,881 B2 | 3/2012 | Vertegaal | |
| 8,430,456 B2 | 4/2013 | Nowalk et al. | |
| 8,544,941 B2 | 10/2013 | Coote et al. | |
| 8,764,108 B2 * | 7/2014 | Gaudreau, Jr. | B60N 2/2851 |
| | | | 297/250.1 |
| 9,010,857 B2 * | 4/2015 | Chen | B60N 2/286 |
| | | | 297/256.13 |
| 9,073,459 B2 * | 7/2015 | Chen | B60N 2/2863 |
| 9,150,126 B1 * | 10/2015 | Kitchens | B60N 2/2806 |
| 9,156,379 B2 | 10/2015 | Williams et al. | |
| 9,162,593 B2 | 10/2015 | Spence | |
| 9,452,695 B2 | 9/2016 | Sedlack | |
| 9,771,007 B2 | 9/2017 | Shellenberger | |
| 10,632,871 B2 * | 4/2020 | Schmitz | B60N 2/2851 |
| 2005/0110318 A1 * | 5/2005 | Meeker | B60N 2/2812 |
| | | | 297/256.16 |
| 2008/0030055 A1 | 2/2008 | Renaudin | |
| 2009/0102257 A1 * | 4/2009 | Collias | B60N 2/2875 |
| | | | 297/256.16 |
| 2010/0244519 A1 * | 9/2010 | Dingier | B60N 2/2821 |
| | | | 297/256.16 |
| 2011/0169310 A1 * | 7/2011 | Keegan | B60N 2/2821 |
| | | | 297/256.16 |
| 2011/0193382 A1 * | 8/2011 | Gaudreau, Jr. | B60N 2/2821 |
| | | | 297/256.13 |
| 2012/0200131 A1 | 8/2012 | Mason et al. | |
| 2012/0261958 A1 | 10/2012 | Hutchinson et al. | |
| 2012/0313413 A1 | 12/2012 | Hutchinson et al. | |
| 2013/0320725 A1 * | 12/2013 | Conway | B60N 2/2863 |
| | | | 297/256.11 |
| 2014/0008955 A1 * | 1/2014 | Spence | B60N 2/2851 |
| | | | 297/256.16 |
| 2014/0252827 A1 * | 9/2014 | Taylor | B60N 2/2851 |
| | | | 297/256.13 |
| 2014/0265488 A1 * | 9/2014 | Heisey | B60N 2/2875 |
| | | | 297/256.13 |
| 2014/0284977 A1 | 9/2014 | Williams | |
| 2015/0076878 A1 * | 3/2015 | Jane Santamaria | B60N 2/2824 |
| | | | 297/256.13 |
| 2015/0091348 A1 * | 4/2015 | Juchniewicz | B60N 2/2887 |
| | | | 297/256.16 |
| 2016/0114706 A1 | 4/2016 | Hutchinson et al. | |
| 2016/0347212 A1 | 12/2016 | Mason et al. | |
| 2018/0126877 A1 | 5/2018 | Williams | |
| 2018/0236904 A1 | 8/2018 | Lehman et al. | |
| 2019/0077282 A1 * | 3/2019 | Reaves | B60N 2/2869 |
| 2019/0232826 A1 * | 8/2019 | Lehman | B60N 2/2806 |
| 2020/0223331 A1 * | 7/2020 | Mason | B60N 2/2872 |
| 2020/0223332 A1 * | 7/2020 | Ma | B60N 2/2863 |
| 2020/0223333 A1 | 7/2020 | Mason et al. | |

FOREIGN PATENT DOCUMENTS

| | | | | |
|---|---|---|---|---|
| CN | 201907438 U | 7/2011 | | |
| CN | 202152019 U | 2/2012 | | |
| CN | 102427965 A | 4/2012 | | |
| CN | 102811884 A | 12/2012 | | |
| CN | 103419684 A | 12/2013 | | |
| CN | 103707784 A | 4/2014 | | |
| CN | 103991393 A | 8/2014 | | |
| CN | 104709123 A | 6/2015 | | |
| CN | 205674904 U | 11/2016 | | |
| CN | 108146303 A | 6/2018 | | |
| CN | 108657033 A | 10/2018 | | |
| EP | 1 953 034 A2 | 8/2008 | | |
| EP | 2 147 818 A1 | 1/2010 | | |
| EP | 2 716 494 A1 | 4/2014 | | |
| EP | 2781400 A2 | 9/2014 | | |
| EP | 2865562 | 4/2015 | | |
| EP | 2883745 A1 * | 6/2015 | ........... | B60N 2/2863 |
| JP | 2002029298 A | 1/2002 | | |
| JP | 2007283781 A | 11/2007 | | |
| RO | 133040 A2 | 1/2019 | | |
| WO | 2012/065479 A1 | 5/2012 | | |

OTHER PUBLICATIONS

Chinese Application No. 202010025672.3 filed Jan. 10, 2020; Chinese Office Action dated Nov. 25, 2021 12 pages.
European Application No. 20151140.9 filed Jan. 10, 2020; European Search Reported mailed Nov. 13, 2020; 10 pages.
European Application No. 20151140.9 filed Jan. 10, 2020; Partial European Search Reported mailed Jun. 5, 2020; 5 pages.
European Application No. 20151253.0-1010 filed Jan. 10, 2020; European Search Report mailed Aug. 13, 2020; 5 pages.
European Application No. 20151264.7-1010/3680128 filed Jan. 10, 2020; European Office Action dated Feb. 2, 2021; 4 pages.
European Application No. 20151264.7-1010/3680128 filed Jan. 10, 2020; European Search Report dated Jun. 17, 2020; 5 pages.
European Application No. 21185340.3-1012 filed Jan. 10, 2020; European Search Report dated Oct. 29, 2021; 5 pages.
Japanese Patent Application No. 2020-002217 filed Jan. 9, 2020; Notice of Allowance dated Nov. 24, 2021; 3 pages.
U.S. Appl. No. 16/737,030, filed Jan. 8, 2020; Restriction Requirement dated Apr. 30, 2021; 6 pages.
U.S. Appl. No. 16/737,030, filed Jan. 8, 2020; Final Office Action dated Sep. 15, 2021; 19 pages.
U.S. Appl. No. 16/737,030, filed Jan. 8, 2020; Non-Final Office Action dated Jun. 18, 2021; 23 pages.
U.S. Appl. No. 16/737,030, filed Jan. 8, 2020; Notice of Allowance dated Nov. 5, 2021; 11 pages.
Japanese Patent Application No. 2020-002217 filed Jan. 9, 2020; Japanese Office Action with translation dated Mar. 16, 2021; 8 pages.

(56) References Cited

OTHER PUBLICATIONS

Chinese Application No. 202010024605.X filed Jan. 10, 2020; Chinese Office Action with English Translation dated Nov. 24, 2021; 12 pages.
European Application No. 22156593.0-1012 filed Feb. 14, 2022; European Communication: Extended EP Search Report dated May 2, 2022; 5 pages.

* cited by examiner

CHILD RESTRAINT SYSTEM

CROSS-REFERENCE TO RELATED APPLICATIONS

This application claims the benefit of U.S. Provisional Application No. 62/790,707, filed on Jan. 10, 2019, and U.S. Provisional Application No. 62/846,140, filed on May 10, 2019, and the entire contents of this application are hereby incorporated by reference.

BACKGROUND OF THE INVENTION

1. Field of the Invention

The present invention relates to a child product, and more particularly, to a child restraint system.

2. Description of the Prior Art

A child restraint system (CRS) is an apparatus installed on a seat of a vehicle and provided with a restraint device, such as a harness device, for securing a child sitting therein when traveling. When an emergency brake or a collision of the vehicle occurs, the child restraint system can reduce impact forces acting on the child and restrain the child's body movement by the restraint device for preventing injury or death of the child for ensuring sitting safety of the child. In order to provide a protection for the child, the child restraint system needs adequate structural strength to resist impact forces and has to be adjusted to a proper orientation for the child after installation. Therefore, there is a need to provide an improved child restraint system with adequate structural strength and a wide adjustment range.

SUMMARY OF THE INVENTION

It is an objective of the present invention to provide a child restraint system for solving the aforementioned problems.

In order to achieve the aforementioned problems, the present invention discloses a child restraint system. The child restraint system includes a main body and an adjusting foot. The main body includes a seat portion, a backrest portion, a first supporting portion and a second supporting portion. The first supporting portion is located adjacent to a first end of the seat portion away from the backrest portion, and the second supporting portion is located adjacent to a second end of the seat portion connected to the backrest portion. The adjusting foot is movably disposed on the main body and includes a third supporting portion. The first supporting portion and the third supporting portion abut against a vehicle seat to support the child restraint system at a forward facing position on the vehicle seat, and the second supporting portion and the third supporting portion abut against the vehicle seat to support the child restraint system at a rearward facing position on the vehicle seat.

According to an embodiment of the present invention, the main body further includes a reclining foot pivotally disposed on the seat portion, and the first supporting portion is formed on the reclining foot.

According to an embodiment of the present invention, a pivotal joint of the reclining foot and the main body and a center of gravity of the child restraint system are aligned along a gravity direction, and the pivotal joint of the reclining foot and the main body is located directly below the center of gravity of the child restraint system.

According to an embodiment of the present invention, the adjusting foot is pivotally disposed on the reclining foot and pivotally switchable between a forward position and a rearward position.

According to an embodiment of the present invention, the first supporting portion and the third supporting portion abut against the vehicle seat to support the child restraint system at the forward facing position on the vehicle seat when the adjusting foot is pivotally switched to the rearward position.

According to an embodiment of the present invention, a projection of a center of gravity of the child restraint system along a gravity direction is located between a projection of the first supporting portion along the gravity direction and a projection of the third supporting portion along the gravity direction when the first supporting portion and the third supporting portion abut against the vehicle seat to support the child restraint system at the forward facing position on the vehicle seat.

According to an embodiment of the present invention, the second supporting portion and the third supporting portion abut against the vehicle seat to support the child restraint system at the rearward facing position on the vehicle seat when the adjusting foot is pivotally switched to the forward position.

According to an embodiment of the present invention, a projection of a center of gravity of the child restraint system along a gravity direction is located between a projection of the second supporting portion along the gravity direction and a projection of the third supporting portion along the gravity direction when the second supporting portion and the third supporting portion abut against the vehicle seat to support the child restraint system at the rearward facing position on the vehicle seat.

According to an embodiment of the present invention, the adjusting foot includes at least one first stopping portion to stop the reclining foot to position the adjusting foot at the forward position, and the reclining foot includes at least one second stopping portion to stop the adjusting foot to position the adjusting foot at the rearward position.

According to an embodiment of the present invention, the main body further includes a reclining actuator pivotally disposed on the seat portion for allowing or restraining pivotal movement of the reclining foot relative to the main body.

According to an embodiment of the present invention, at least one first locking portion is formed on the reclining actuator. A plurality of second locking portions are formed on the reclining foot. The reclining actuator restrains the pivotal movement of the reclining foot relative to the main body when the at least one first locking portion engages with a corresponding one of the plurality of second locking portions, and the reclining actuator allows the pivotal movement of the reclining foot relative to the main body when the at least one first locking portion disengages from the corresponding one of the plurality of second locking portions.

According to an embodiment of the present invention, the main body further includes a resilient component abutting against the reclining actuator for biasing the reclining actuator to restrain the pivotal movement of the reclining foot relative to the main body.

According to an embodiment of the present invention, the first supporting portion is formed on the seat portion. The second supporting portion is formed on the seat portion or the backrest portion, and a projection of the third supporting portion along a gravity direction is located between a projection of the first supporting portion along the gravity direction and a projection of the second supporting portion along the gravity direction.

According to an embodiment of the present invention, the adjusting foot is pivotally disposed on the seat portion or the backrest portion.

According to an embodiment of the present invention, the adjusting foot is slidably disposed on the main body.

According to an embodiment of the present invention, the main body further includes at least one reinforcing component disposed along the backrest portion vertically. The at least one reinforcing component includes a first flange, a second flange, a web and a plurality of ribs. The first flange is disposed on the backrest portion. The second flange is substantially disposed parallel to the first flange. The web is connected to the first flange and the second flange. The first flange, the web and the second flange form a C-shaped structure cooperatively. The C-shaped structure has a chamber and a lateral opening, and the plurality of ribs are disposed inside the chamber and connected to the first flange, the second flange and the web.

According to an embodiment of the present invention, the plurality of ribs are arranged to be parallel to each other, or to form at least one triangular structure, or at least one honeycomb structure.

In summary, in the present invention, the first supporting portion and the third supporting portion abut against the vehicle seat to support the child restraint system at the forward facing position on the vehicle seat, and the second supporting portion and the third supporting portion abut against the vehicle seat to support the child restraint system at the rearward facing position on the vehicle seat. In other words, when the child restraint system is at the forward facing position on the vehicle seat, the child restraint system can be adjusted to a proper orientation by adjustment of at least one of the first supporting portion and the third supporting portion. When the child restraint system is at the rearward facing position on the vehicle seat, the child restraint system can be adjusted to a proper orientation by adjustment of at least one of the second supporting portion and the third supporting portion. Therefore, the present invention has advantage of a wide adjustment range. Furthermore, the present invention has increased structural strength to resist impact forces by the reinforcing component.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
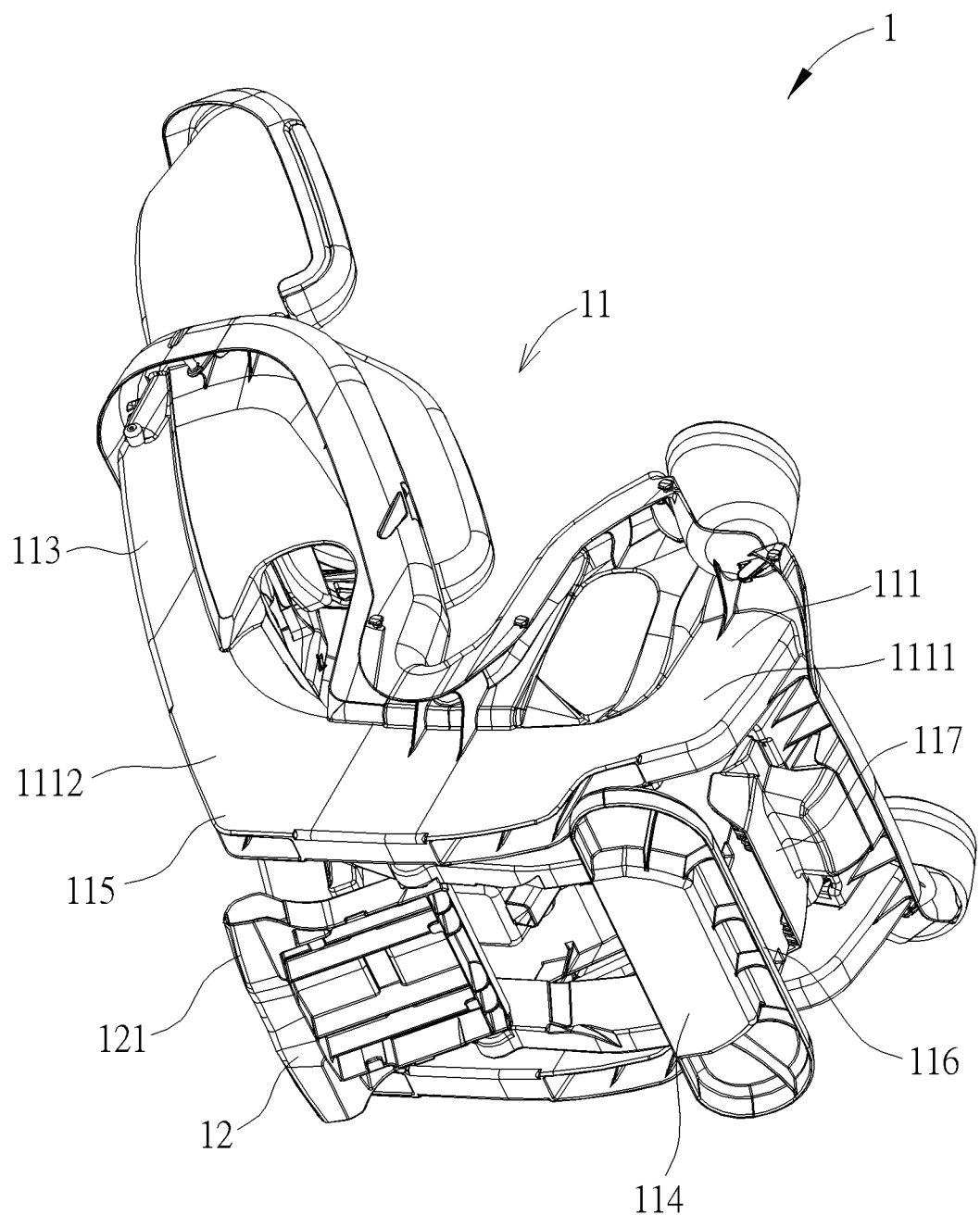
FIG. 1 and FIG. 2 are schematic diagrams of a child restraint system at different views according to a first embodiment of the present invention.
Figure 2:
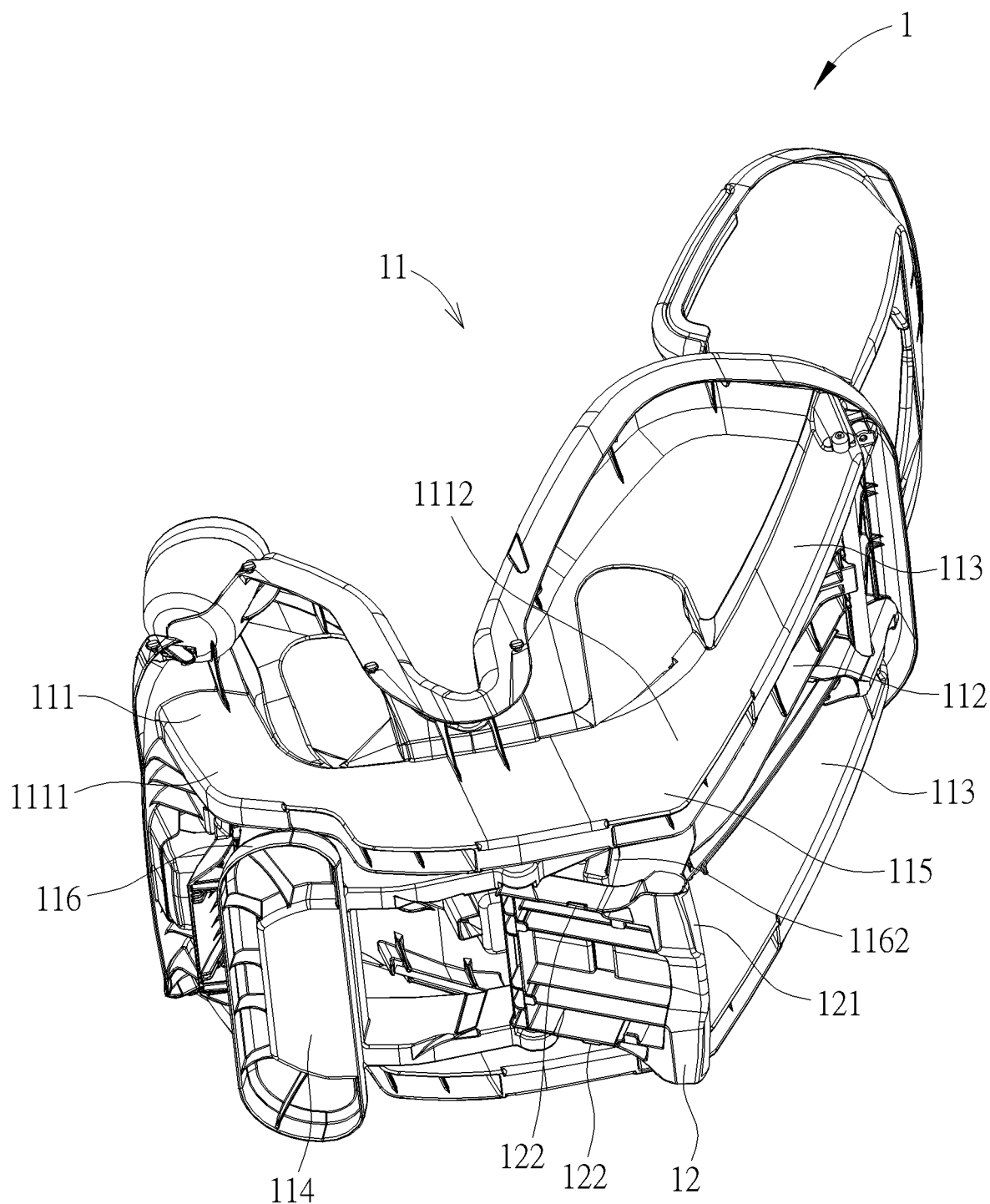
Figure 3:
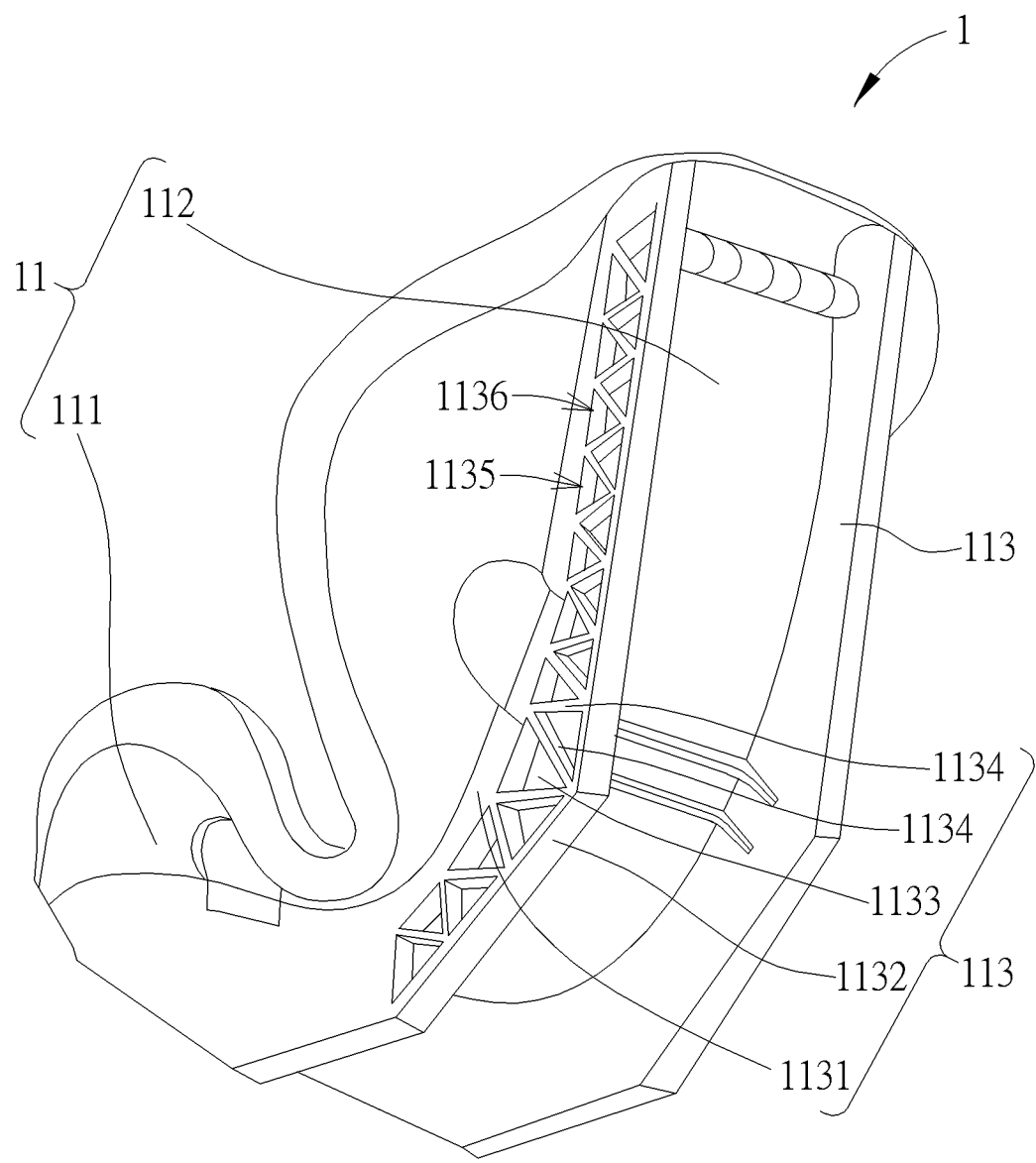
FIG. 3 is a partial diagram of the child restraint system according to the first embodiment of the present invention.
Figure 4:
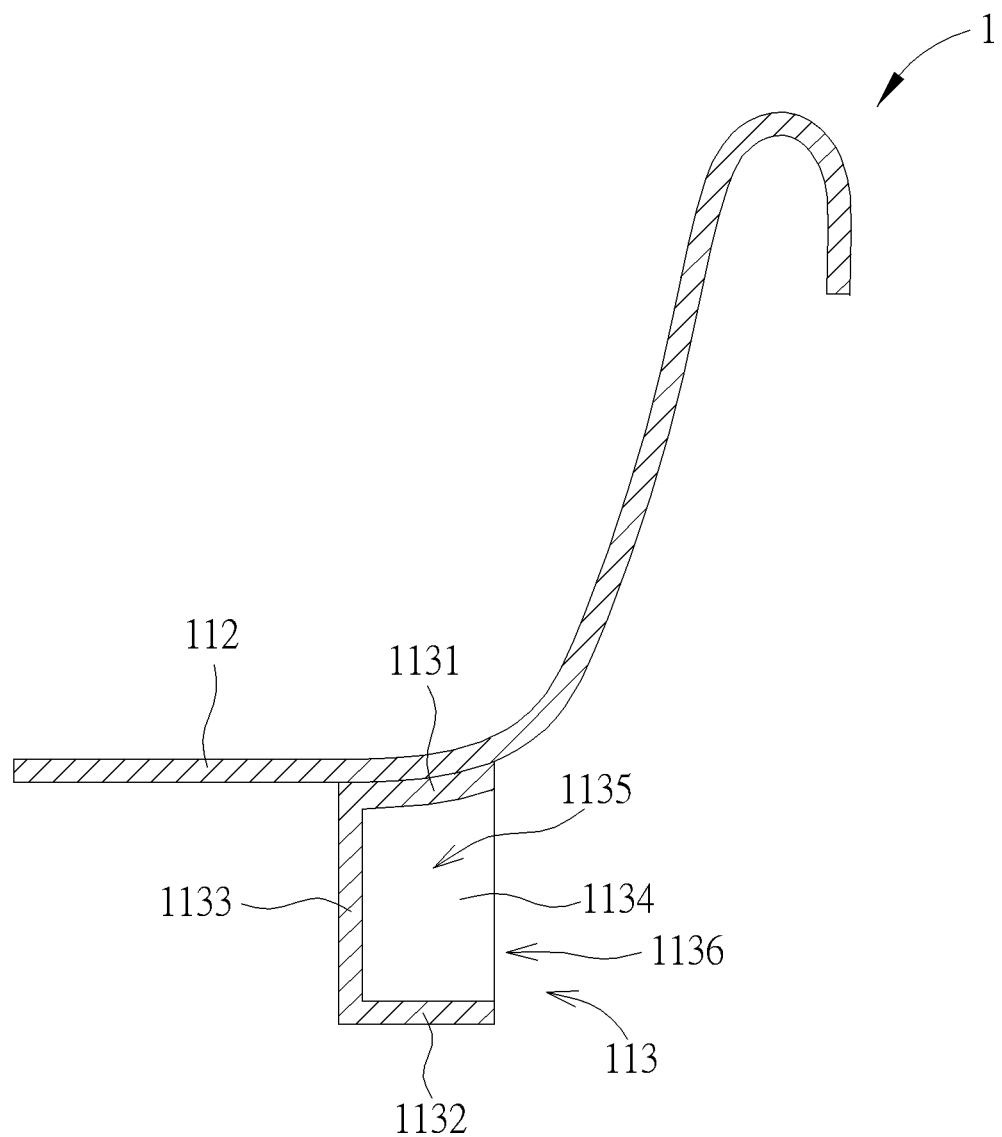
FIG. 4 is a partial sectional diagram of the child restraint system according to the first embodiment of the present invention.

Please refer to FIG. 1 to FIG. 4. FIG. 1 and FIG. 2 are schematic diagrams of a child restraint system 1 according to a first embodiment of the present invention. FIG. 3 is a partial diagram of the child restraint system 1 according to the first embodiment of the present invention. FIG. 4 is a partial sectional diagram of the child restraint system 1 according to the first embodiment of the present invention. As shown in FIG. 1 to FIG. 4, the child restraint system 1 includes a main body 11. The main body 11 includes a seat portion 111, a backrest portion 112 and two reinforcing components 113. The seat portion 111 includes a first end 1111 away from the backrest portion 112 and a second end 1112 connected to the backrest portion 112. The two reinforcing components 113 are disposed along the backrest portion 112 vertically and spaced from each other for enhancing structural strength of the main body 11 to resist impact forces. However, the number and the configuration of the reinforcing component are not limited to this embodiment. For example, in another embodiment, the reinforcing component can be omitted, or there can be only one reinforcing component disposed along the backrest portion.

Each reinforcing component 113 includes a first flange 1131, a second flange 1132, a web 1133 and a plurality of ribs 1134. The first flange 1131 is disposed on the backrest portion 112. The second flange 1132 is substantially disposed parallel to the first flange 1131. The web 1133 is connected to the first flange 1131 and the second flange 1132. The first flange 1131, the web 1133 and the second flange 1132 can be integrated to form a C-shaped structure cooperatively. The C-shaped structure has a chamber 1135 and a lateral opening 1136, and the plurality of ribs 1134 are disposed inside the chamber 1135 and connected to the first flange 1131, the second flange 1132 and the web 1133.

Preferably, in this embodiment, the plurality of ribs 1134 can be arranged to form a plurality of triangular structures.

Such configuration can not only provide adequate structural strength to resist the impact force but also save manufacturing cost because material is placed in highly stressed areas of the main body 11 in a more efficient way. However, the present invention is not limited thereto. For example, in another embodiment, the plurality of ribs can be arranged to form at least one triangular structure or at least one honeycomb structure. Alternatively, in another embodiment, the plurality of ribs also can be arranged to be parallel to each other.

Figure 5:
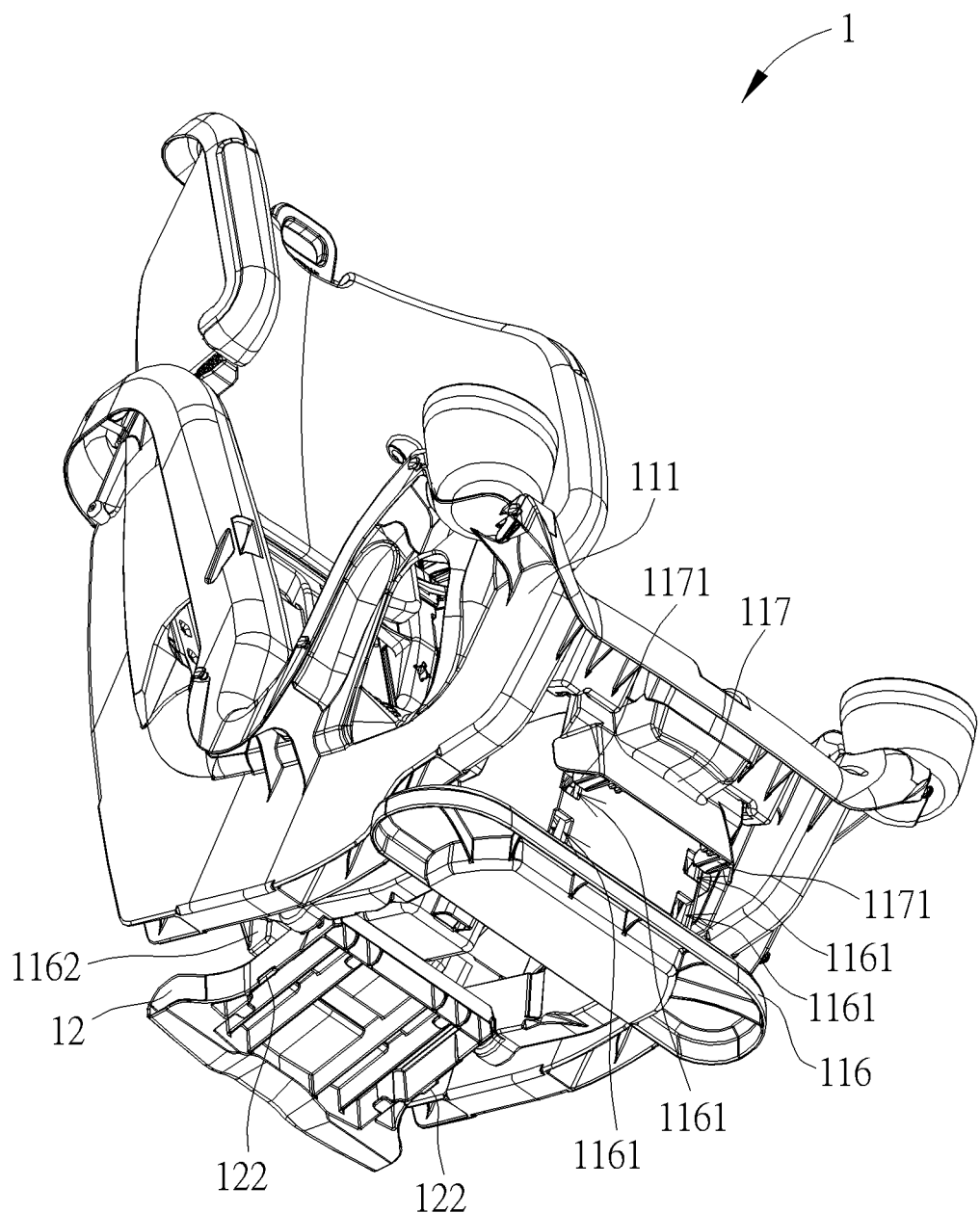
FIG. 5 is a partial diagram of the child restraint system at another view according to the first embodiment of the present invention.
Figure 6:
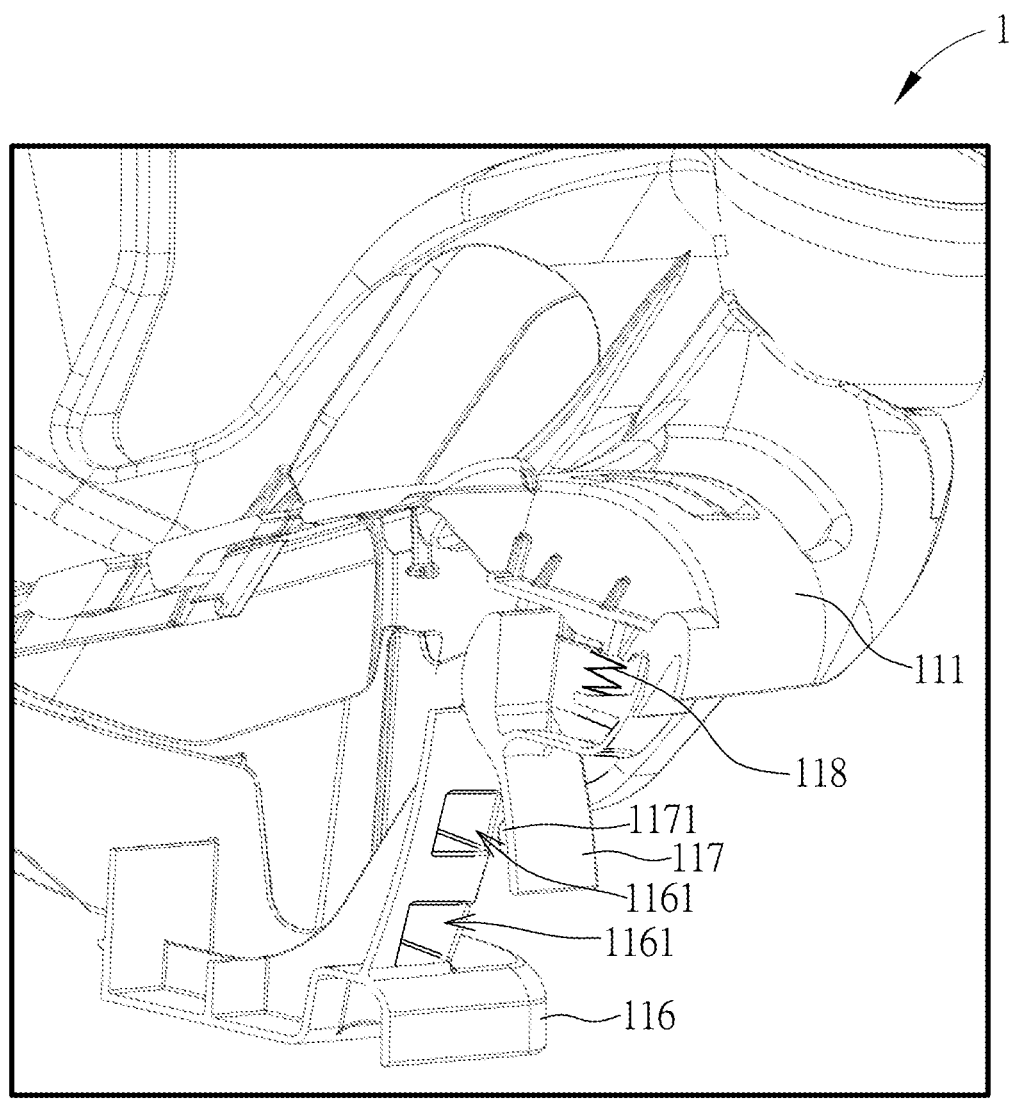
FIG. 6 is a partial internal structural diagram of the child restraint system according to the first embodiment of the present invention.
Figure 7:
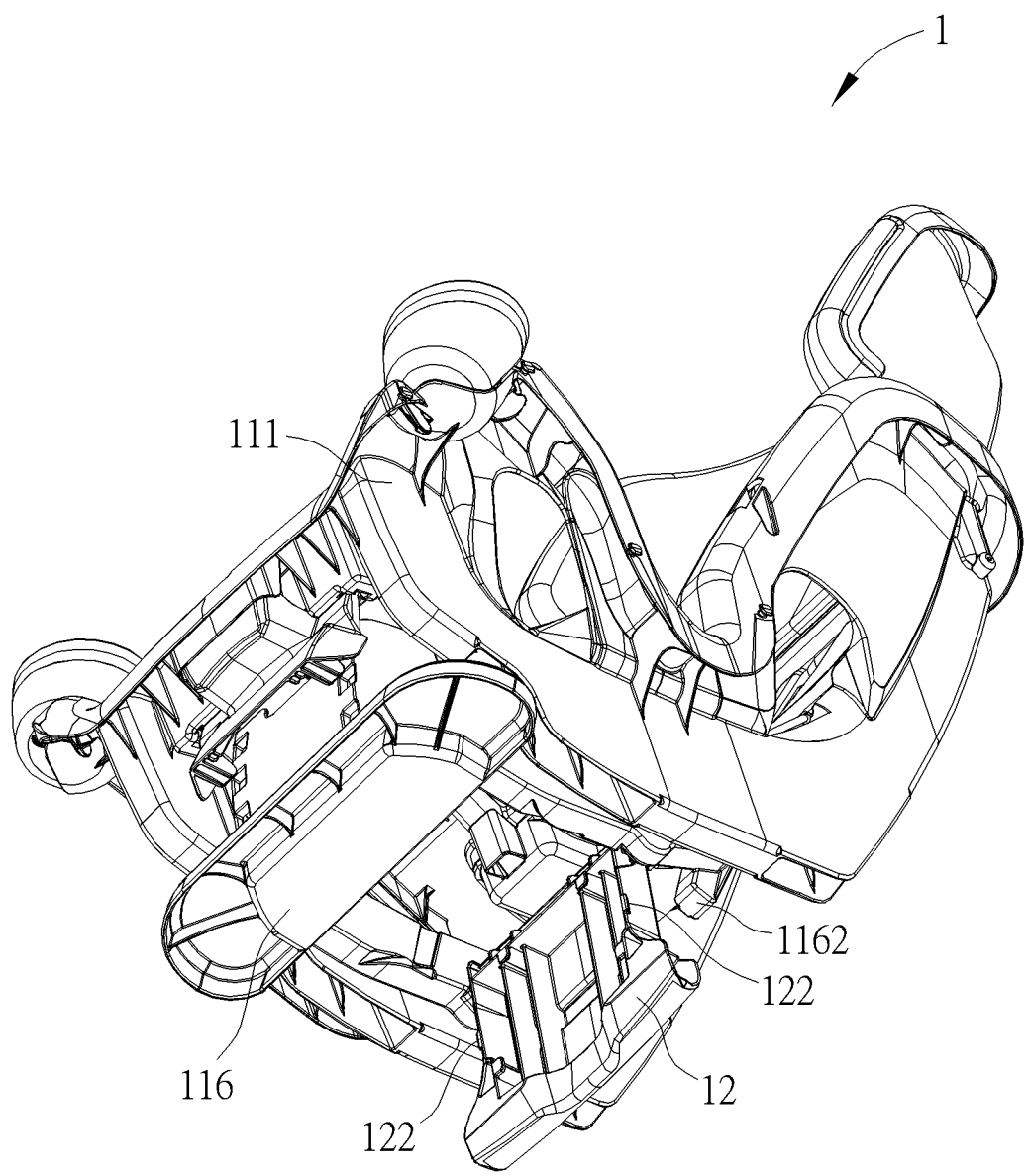
FIG. 7 and FIG. 8 are diagrams of the child restraint system as an adjusting foot is at different positions according to the first embodiment of the present invention.
Figure 8:
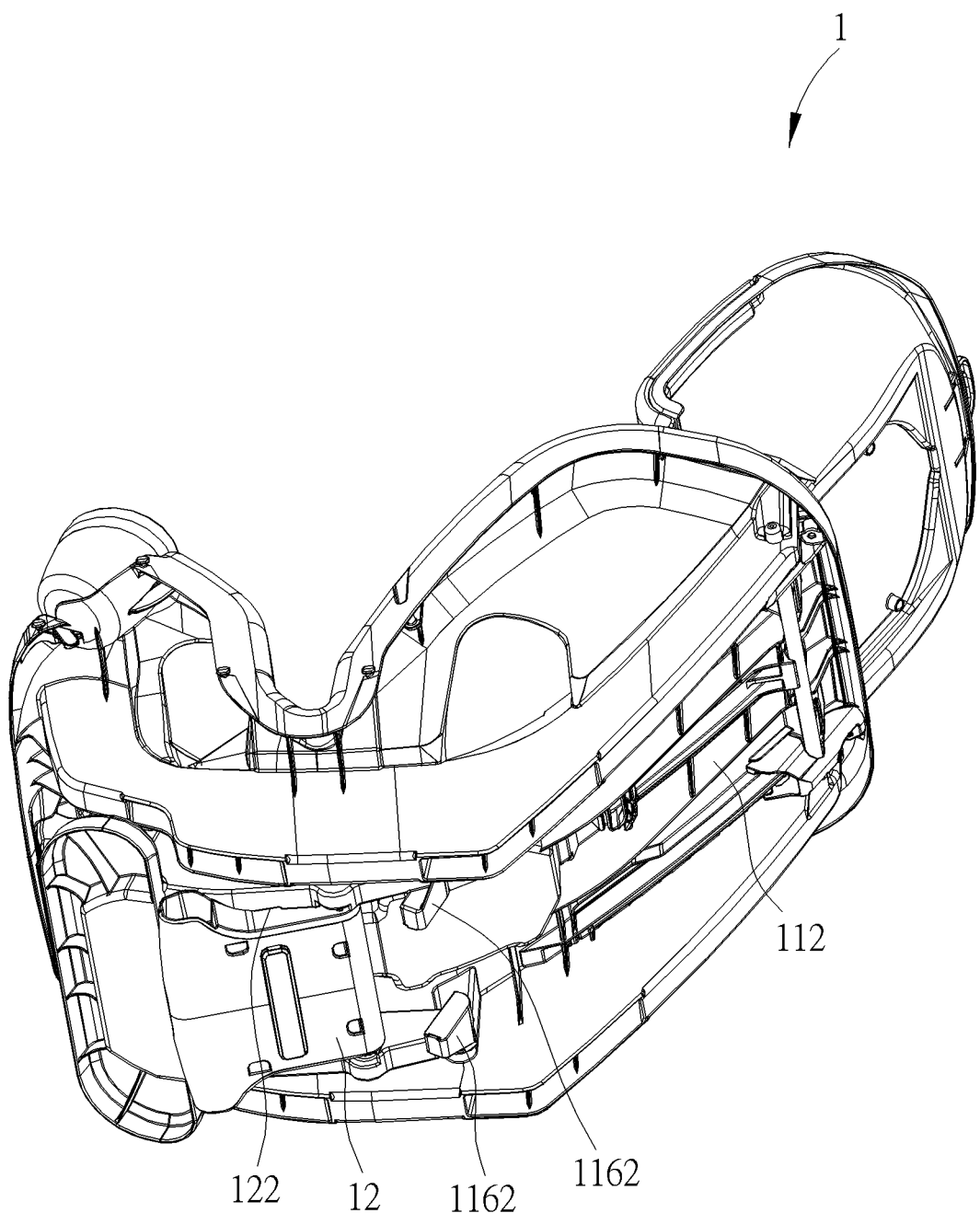
Figure 9:
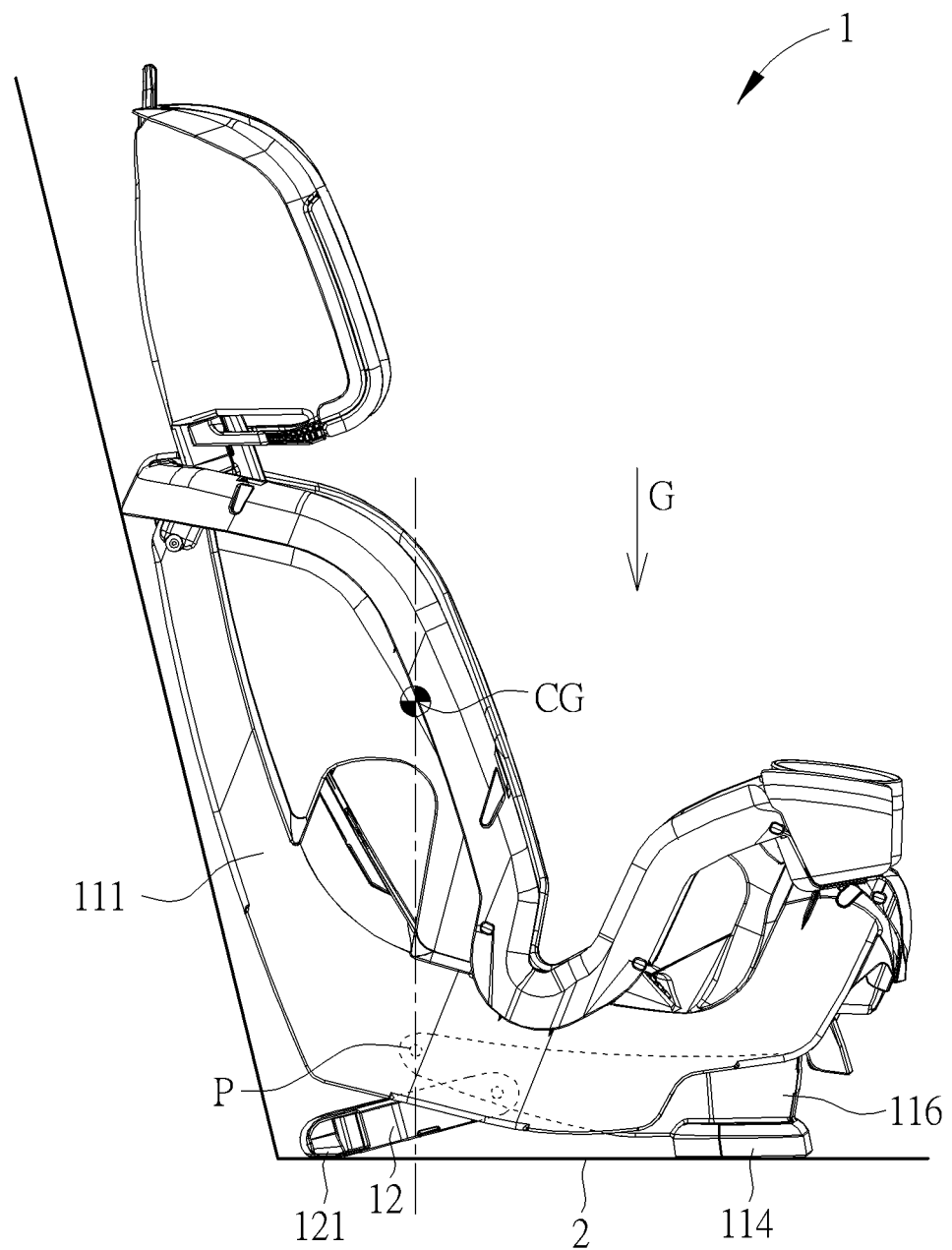
FIG. 9 is a diagram of the child restraint system located at a forward facing position on a vehicle seat according to the first embodiment of the present invention.
Figure 10:
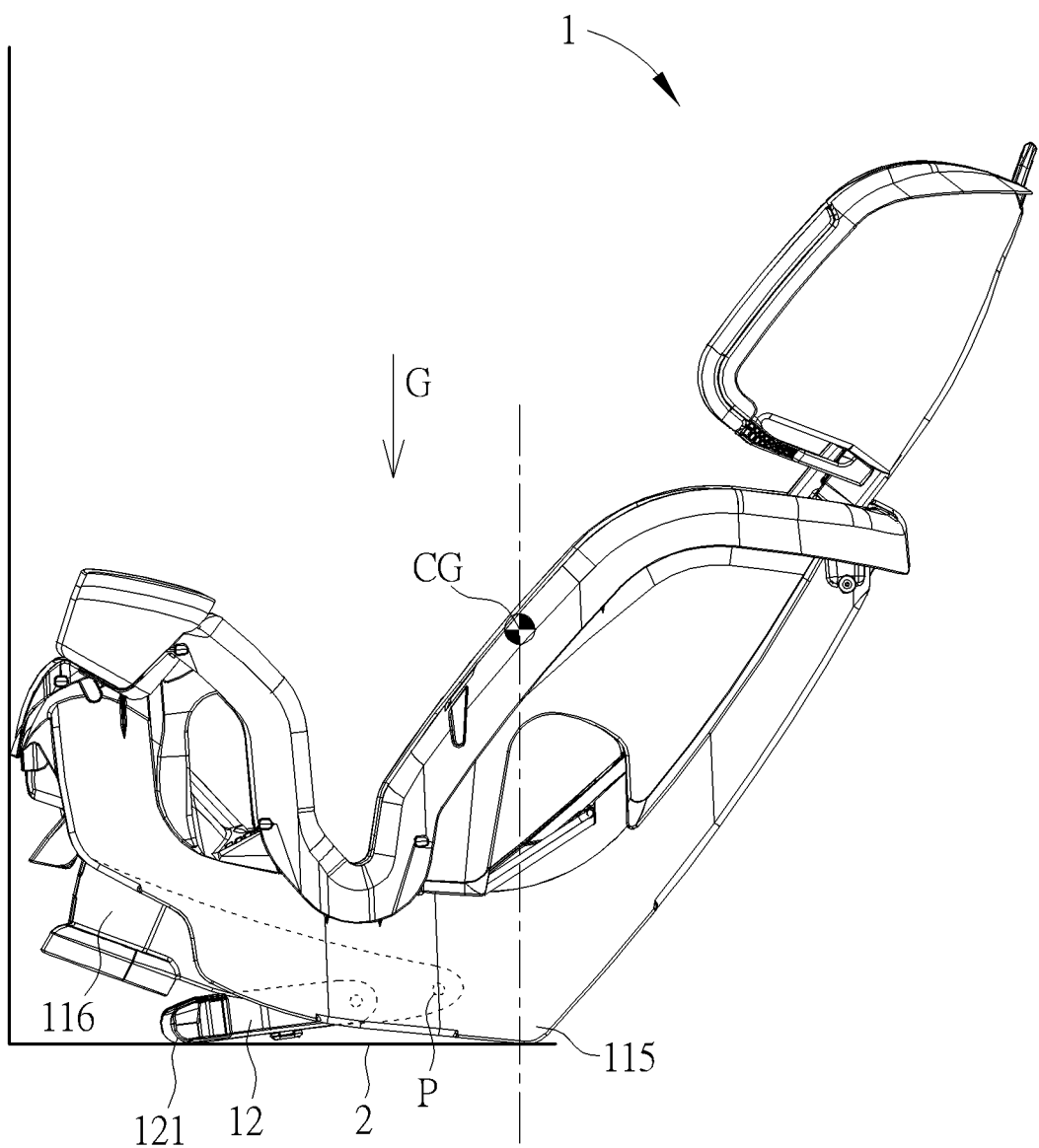
FIG. 10 is a diagram of the child restraint system located at a rearward facing position on the vehicle seat according to the first embodiment of the present invention.

Please refer to FIG. 1, FIG. 2 and FIG. 5 to FIG. 10. FIG. 5 is a partial diagram of the child restraint system 1 at another view according to the first embodiment of the present invention. FIG. 6 is a partial internal structural diagram of the child restraint system 1 according to the first embodiment of the present invention. FIG. 7 and FIG. 8 are diagrams of the child restraint system 1 as an adjusting foot 12 is at different positions according to the first embodiment of the present invention. FIG. 9 is a diagram of the child restraint system 1 located at a forward facing position on a vehicle seat 2 according to the first embodiment of the present invention. FIG. 10 is a diagram of the child restraint system 1 located at a rearward facing position on the vehicle seat 2 according to the first embodiment of the present invention. As shown in FIG. 1, FIG. 2 and FIG. 5 to FIG. 10, the child restraint system 1 further includes the adjusting foot 12, and the main body 11 further includes a first supporting portion 114, a second supporting portion 115 and a reclining foot 116. The reclining foot 116 is pivotally disposed on the seat portion 111, and the first supporting portion 114 is formed on the reclining foot 116 and located adjacent to the first end 1111 of the seat portion 111 away from the backrest portion 112. The second supporting portion 115 is formed on the seat portion 111 or the backrest portion 112 and located adjacent to the second end 1112 of the seat portion 111 connected to the backrest portion 112. The adjusting foot 12 includes a third supporting portion 121. The adjusting foot 12 is pivotally disposed on the reclining foot 116 and pivotally switchable between a forward position as shown in FIG. 8 and a rearward position as shown in FIG. 2. However, the present invention is not limited to this embodiment. For example, in another embodiment, the adjusting foot can be movably disposed on the main body instead of the reclining foot.

Besides, the main body 11 further includes a reclining actuator 117 pivotally disposed on the seat portion 111 for allowing or restraining pivotal movement of the reclining foot 116 relative to the main body 11, and a resilient component 118 abutting against the reclining actuator 117 for biasing the reclining actuator 117 to restrain the pivotal movement of the reclining foot 116 relative to the main body 11.

Preferably, in this embodiment, two first locking portions 1171 are formed on the reclining actuator 117, and a plurality of second locking portions 1161 are formed on the reclining foot 116. The reclining actuator 117 restrains the pivotal movement of the reclining foot 116 relative to the main body 11 when the two first locking portions 1711 engage with the two corresponding second locking portions 1161, and the reclining actuator 117 allows the pivotal movement of the reclining foot 116 relative to the main body 11 when the two first locking portions 1171 disengage from the two corresponding second locking portions 1161. The resilient component 118 abuts against the reclining actuator 117 for biasing the two first locking portions 1171 to engage with the two corresponding second locking portions 1161. However, the present invention is not limited to this embodiment. Any mechanism capable of allowing and restraining the pivotal movement of the reclining foot is included within the scope of the invention.

Furthermore, the adjusting foot 12 includes two first stopping portions 122 to stop the reclining foot 116 to position the adjusting foot 12 at the forward position, and the reclining foot 116 includes two second stopping portion 1162 to stop the adjusting foot 12 to position the adjusting foot 12 at the rearward position. In this embodiment, each second stopping portion 1162 can preferably be adjustable in a rotary manner, so as to adjust an angle of the adjusting foot 12 at the rearward position. However, the present invention is not limited to this embodiment. For example, in another embodiment, there can be only one first stopping portion and the second stopping portion. Alternatively, in another embodiment, the child restraint system can further include an adjusting actuator for allowing and restraining pivotal movement of the adjusting foot, so as to position the adjusting foot at any position between the forward position and the rearward position, and the first stopping portion and the second stopping portion can be omitted.

As shown in FIG. 9, when it is desired to install the child restraint system 1 on the vehicle seat 2 at the forward facing position, the adjusting foot 12 can be switched to the rearward position, so that the first supporting portion 114 and the third supporting portion 121 abut against the vehicle seat 2 to support the child restraint system 1 at the forward facing position on the vehicle seat 2. At this moment, an inclined angle of the child restraint system 1 at the forward facing position can be adjusted by pivotal movement of the reclining foot 116 and/or pivotal movement of the adjusting foot 12.

It should be noticed that, a projection of a center of gravity CG of the child restraint system 1 along a gravity direction G a supporting line, e.g., a line on a supporting surface of the vehicle seat 2, is located between a projection of the first supporting portion 114 along the gravity direction G on the supporting line and a projection of the third supporting portion 121 along the gravity direction G on the supporting line when the first supporting portion 114 and the third supporting portion 121 abut against the vehicle seat 2 to support the child restraint system 1 at the forward facing position on the vehicle seat 2. Such configuration can ensure the child restraint system 1 at the forward facing position to be supported stably by the first supporting portion 114 and the third supporting portion 121.

Furthermore, as shown in FIG. 9, in this embodiment, when the child restraint system 1 is installed on the vehicle seat 2 at the forward position, a pivotal joint P of the reclining foot 116 and the main body 11 and the center of gravity CG of the child restraint system 1 can be preferably aligned along the gravity direction G, and the pivotal joint P of the reclining foot 116 and the main body 11 can be located directly below the center of gravity CG of the child restraint system 1. Such configuration can prevent the child restraint system 1 from being turned over by gravity when the two first locking portions 1171 disengage from the two corresponding second locking portions 1161 unintentionally.

As shown in FIG. 10, when it is desired to install the child restraint system 1 on the vehicle seat 2 at the rearward facing position, the adjusting foot 12 can be switched to the forward position, so that the second supporting portion 115 and the third supporting portion 121 abut against the vehicle seat 2 to support the child restraint system 1 at the rearward facing position on the vehicle seat 2. At this moment, an inclined angle of the child restraint system 1 at the rearward facing position can be adjusted by pivotal movement of the reclining foot 116 and pivotal movement of the adjusting foot 12 together because the adjusting foot 12 abuts against the reclining foot 116 by the first stopping portion 122, which is shown in FIG. 8.

It should be noticed that, a projection of the center of gravity CG of the child restraint system 1 along the gravity direction G on the supporting line is located between a projection of the second supporting portion 115 along the gravity direction G on the supporting line and a projection of the third supporting portion 121 along the gravity direction on the supporting line when the second supporting portion 115 and the third supporting portion 121 abut against the vehicle seat 2 to support the child restraint system 1 at the rearward facing position on the vehicle seat 2. Such configuration can ensure the child restraint system 1 at the rearward facing position to be supported stably by the second supporting portion 115 and the third supporting portion 121.

Figure 11:
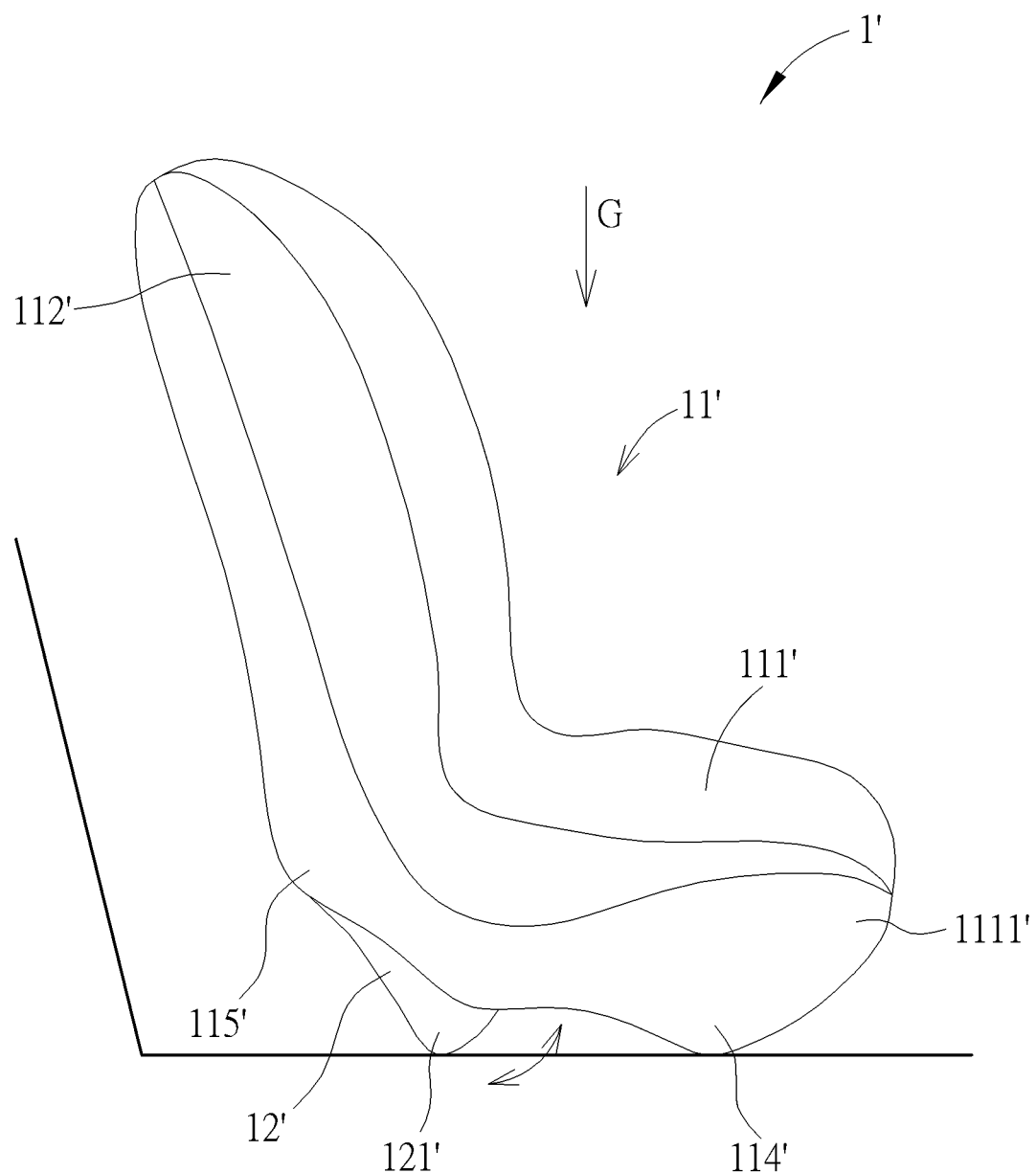
FIG. 11 and FIG. 12 are diagrams of a child restraint system at different positions according to a second embodiment of the present invention.
Figure 12:
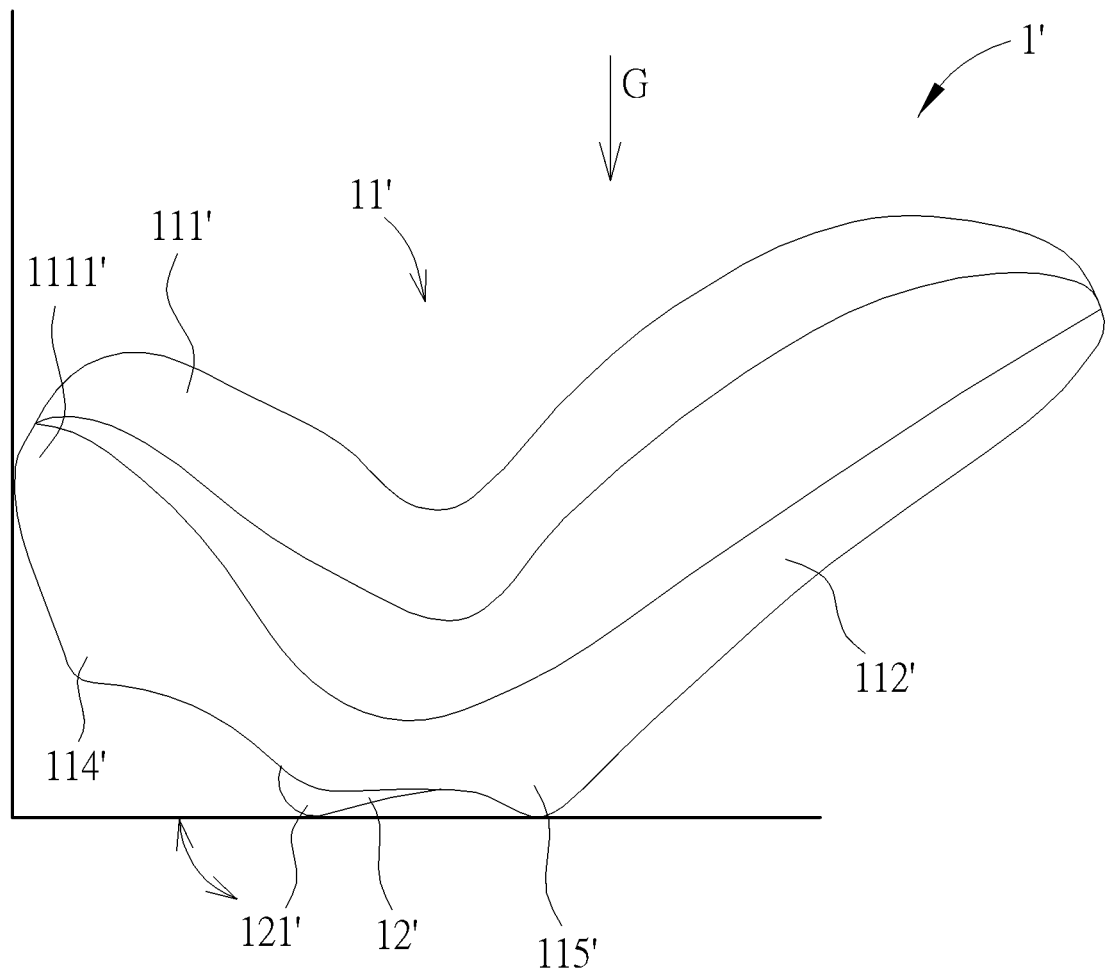

However, the child restraint system of the present invention is not limited to the above-mentioned embodiment. For example, please refer to FIG. 11 to FIG. 12. FIG. 11 and FIG. 12 are diagrams of a child restraint system 1' at different positions according to a second embodiment of the present invention. As shown in FIG. 11 and FIG. 12, different from the first embodiment, a first supporting portion 114' is directly formed on a front end of a main body 11' of the child restraint system 1' and located adjacent to a first end 1111' of a seat portion 111' away from the backrest portion 112', and an adjusting foot 12' is pivotally disposed on a rear end of the main body 11'. A second supporting portion 115' is formed on the seat portion 111' or the backrest portion 112' and located adjacent to a connection of the seat portion 111' connected to the backrest portion 112'. In other words, in this embodiment, the reclining foot is omitted. The first supporting portion 114' and a third supporting portion 121' of the adjusting foot 12' abut against a vehicle seat to support the child restraint system 1' at the forward facing position on the vehicle seat. The second supporting portion 115' and the third supporting portion 121' abut against the vehicle seat to support the child restraint system 1' at the rearward facing position on the vehicle seat. Furthermore, an inclined angle of the child restraint system 1' can be adjusted by pivotal movement of the adjusting foot 12' no matter when the child restraint system 1' is at the forward facing position or the rearward facing position.

Figure 13:
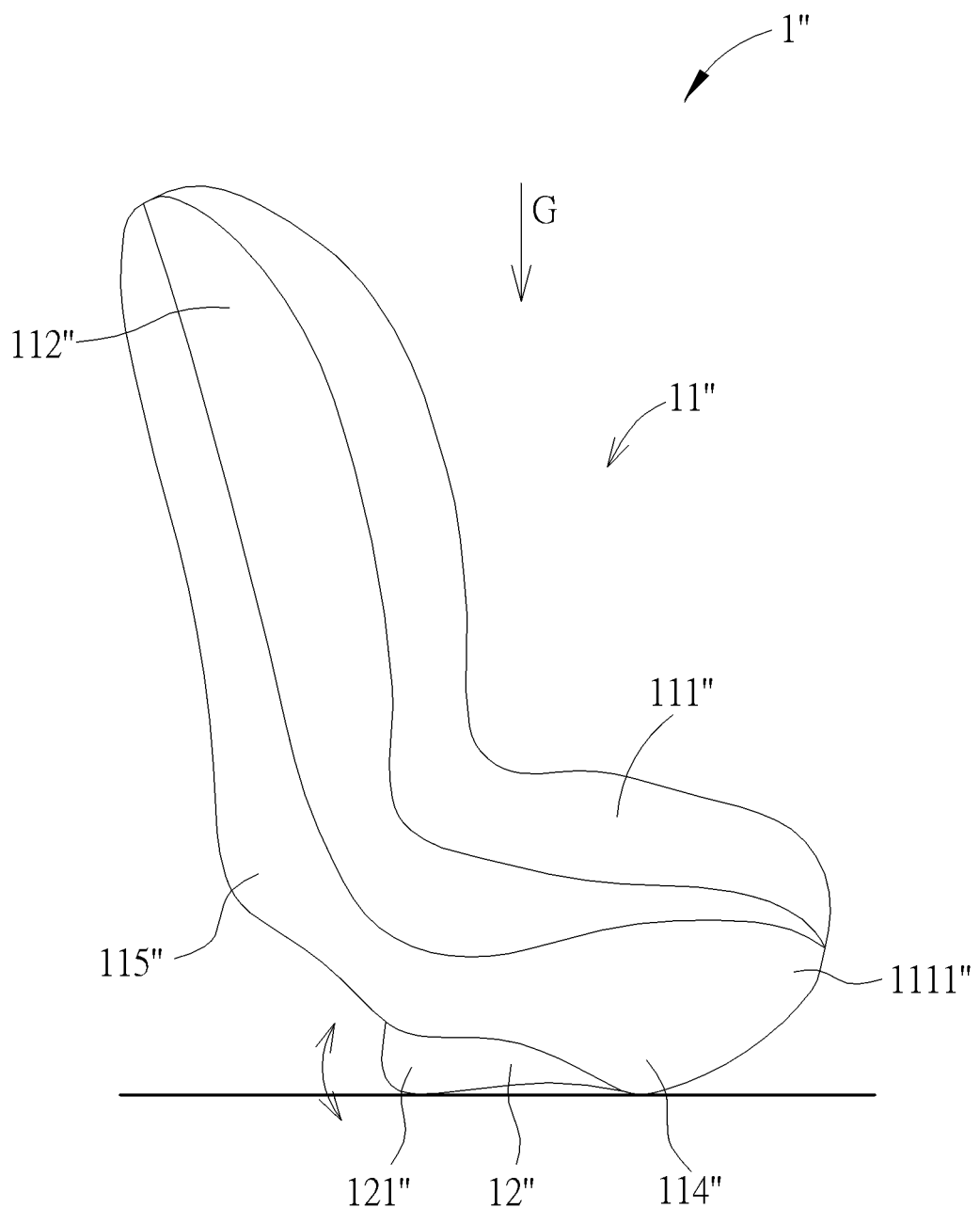
FIG. 13 is a diagram of a child restraint system according to a third embodiment of the present invention.
Figure 14:
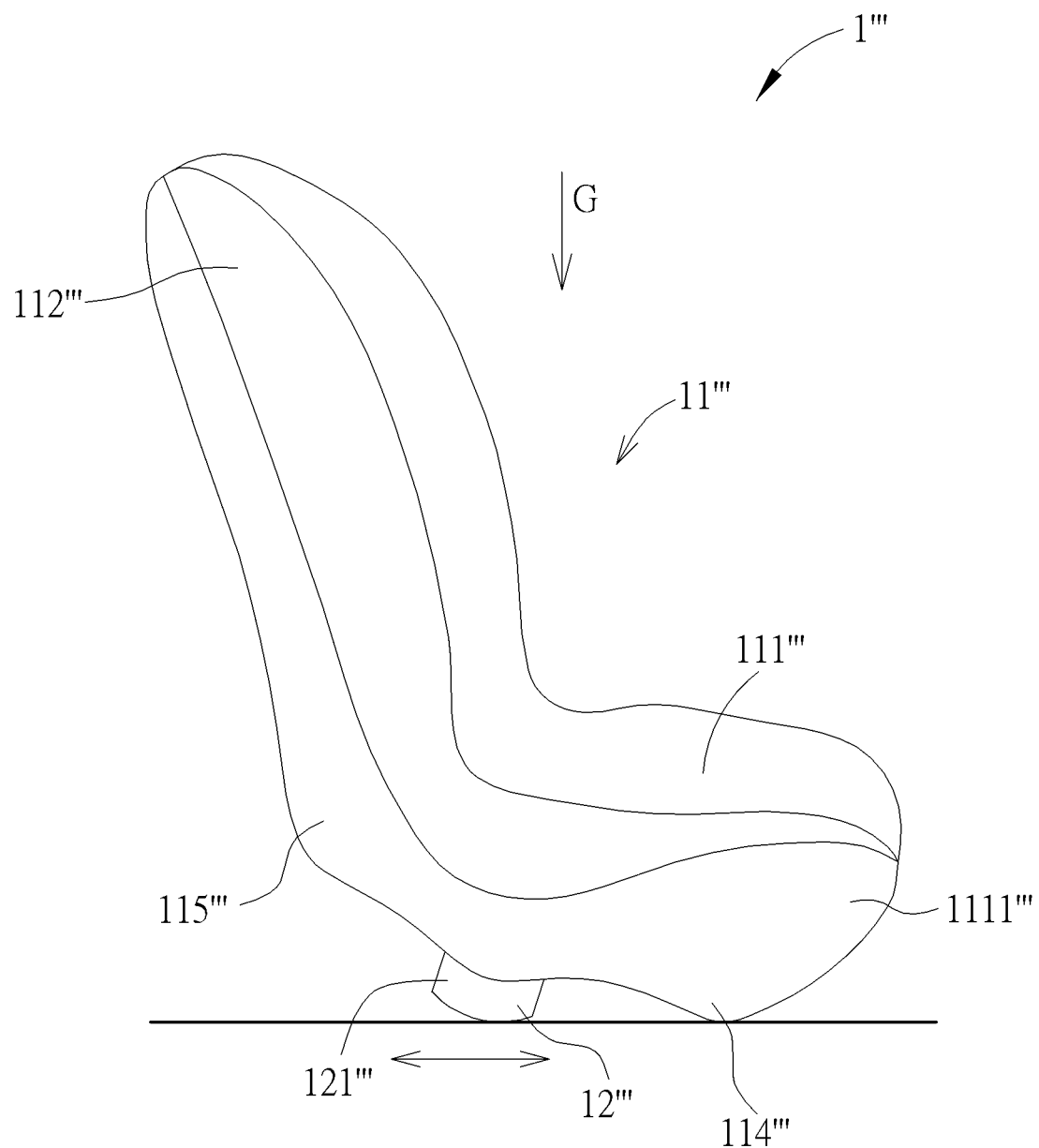
FIG. 14 is a diagram of a child restraint system according to a fourth embodiment of the present invention.

Besides, please refer to FIG. 13 and FIG. 14. FIG. 13 is a diagram of a child restraint system 1" according to a third embodiment of the present invention. As shown in FIG. 13, different from the second embodiment, an adjusting foot 12" of this embodiment is pivotally disposed on a front end of a main body 11". Furthermore, the reclining foot is omitted, and an inclined angle of the child restraint system 1" can be adjusted by pivotal movement of the adjusting foot 12" no matter when the child restraint system 1" is at the forward facing position or the rearward facing position. FIG. 14 is a diagram of a child restraint system 1''' according to a fourth embodiment of the present invention. As shown in FIG. 14, different from the second embodiment, an adjusting foot 12''' of this embodiment is slidably disposed on a bottom portion of a main body 11'''. Furthermore, the reclining foot is omitted, and an inclined angle of the child restraint system 1''' can be adjusted by sliding movement of the adjusting foot 12''' no matter when the child restraint system 1''' is at the forward facing position or the rearward facing position.

In contrast to the prior art, in the present invention, the first supporting portion and the third supporting portion abut against the vehicle seat to support the child restraint system at the forward facing position on the vehicle seat, and the second supporting portion and the third supporting portion abut against the vehicle seat to support the child restraint system at the rearward facing position on the vehicle seat. In other words, when the child restraint system is at the forward facing position on the vehicle seat, the child restraint system can be adjusted to a proper orientation by adjustment of at least one of the first supporting portion and the third supporting portion. When the child restraint system is at the rearward facing position on the vehicle seat, the child restraint system can be adjusted to a proper orientation by adjustment of at least one of the second supporting portion and the third supporting portion. Therefore, the present invention has advantage of a wide adjustment range. Furthermore, the present invention has increased structural strength to resist impact forces by the reinforcing component.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child restraint system comprising:
   a main body comprising a reclining foot, a seat portion, a backrest portion, a first supporting portion and a second supporting portion, the reclining foot being pivotally disposed on the seat portion, the first supporting portion being formed on the reclining foot and located adjacent to a first end of the seat portion away from the backrest portion, and the second supporting portion being located adjacent to a second end of the seat portion connected to the backrest portion; and
   an adjusting foot movably disposed on the main body and comprising a third supporting portion, the first supporting portion and the third supporting portion abutting against a vehicle seat to support the child restraint system at a forward facing position on the vehicle seat, and the second supporting portion and the third supporting portion abutting against the vehicle seat to support the child restraint system at a rearward facing position on the vehicle seat.

2. The child restraint system of claim 1, wherein a pivotal joint of the reclining foot and the main body and a center of gravity of the child restraint system are aligned along a gravity direction, and the pivotal joint of the reclining foot and the main body is located directly below the center of gravity of the child restraint system.

3. The child restraint system of claim 1, wherein the adjusting foot is pivotally disposed on the reclining foot and pivotally switchable between a forward position and a rearward position.

4. The child restraint system of claim 3, wherein the first supporting portion and the third supporting portion abut against the vehicle seat to support the child restraint system at the forward facing position on the vehicle seat when the adjusting foot is pivotally switched to the rearward position.

5. The child restraint system of claim 4, wherein a projection of a center of gravity of the child restraint system along a gravity direction is located between a projection of the first supporting portion along the gravity direction and a projection of the third supporting portion along the gravity direction when the first supporting portion and the third supporting portion abut against the vehicle seat to support the child restraint system at the forward facing position on the vehicle seat.

6. The child restraint system of claim 3, wherein the second supporting portion and the third supporting portion abut against the vehicle seat to support the child restraint system at the rearward facing position on the vehicle seat when the adjusting foot is pivotally switched to the forward position.

7. The child restraint system of claim 6, wherein a projection of a center of gravity of the child restraint system along a gravity direction is located between a projection of the second supporting portion along the gravity direction and a projection of the third supporting portion along the gravity direction when the second supporting portion and the third supporting portion abut against the vehicle seat to support the child restraint system at the rearward facing position on the vehicle seat.

8. The child restraint system of claim 3, wherein the adjusting foot comprises at least one first stopping portion to stop the reclining foot to position the adjusting foot at the forward position, and the reclining foot comprises at least one second stopping portion to stop the adjusting foot to position the adjusting foot at the rearward position.

9. The child restraint system of claim 1, wherein the main body further comprises a reclining actuator pivotally disposed on the seat portion for allowing or restraining pivotal movement of the reclining foot relative to the main body.

10. The child restraint system of claim 9, wherein at least one first locking portion is formed on the reclining actuator, a plurality of second locking portions are formed on the reclining foot, the reclining actuator restrains the pivotal movement of the reclining foot relative to the main body when the at least one first locking portion engages with a corresponding one of the plurality of second locking portions, and the reclining actuator allows the pivotal movement of the reclining foot relative to the main body when the at least one first locking portion disengages from the corresponding one of the plurality of second locking portions.

11. The child restraint system of claim 9, wherein the reclining actuator is biased to restrain the pivotal movement of the reclining foot relative to the main body.

12. The child restraint system of claim 1, wherein the first supporting portion is formed on the seat portion, the second supporting portion is formed on the seat portion or the backrest portion, and a projection of the third supporting portion along a gravity direction is located between a projection of the first supporting portion along the gravity direction and a projection of the second supporting portion along the gravity direction.

13. The child restraint system of claim 12, wherein the adjusting foot is pivotally disposed on the seat portion or the backrest portion.

14. The child restraint system of claim 12, wherein the adjusting foot is slidably disposed on the main body.

15. The child restraint system of claim 1, wherein the main body further comprises at least one reinforcing component disposed along the backrest portion vertically, the at least one reinforcing component comprises a first flange, a second flange, a web and a plurality of ribs, the first flange is disposed on the backrest portion, the second flange is substantially disposed parallel to the first flange, the web is connected to the first flange and the second flange, the first flange, the web and the second flange form a C-shaped structure cooperatively, the C-shaped structure has a chamber and a lateral opening, and the plurality of ribs are disposed inside the chamber and connected to the first flange, the second flange and the web.

16. The child restraint system of claim 15, wherein the plurality of ribs are arranged to be parallel to each other, or to form at least one triangular structure, or at least one honeycomb structure.

* * * * *